Feb. 2, 1926. 1,571,343
A. L. REGISTER
PIPE UNION
Filed Feb. 20, 1925
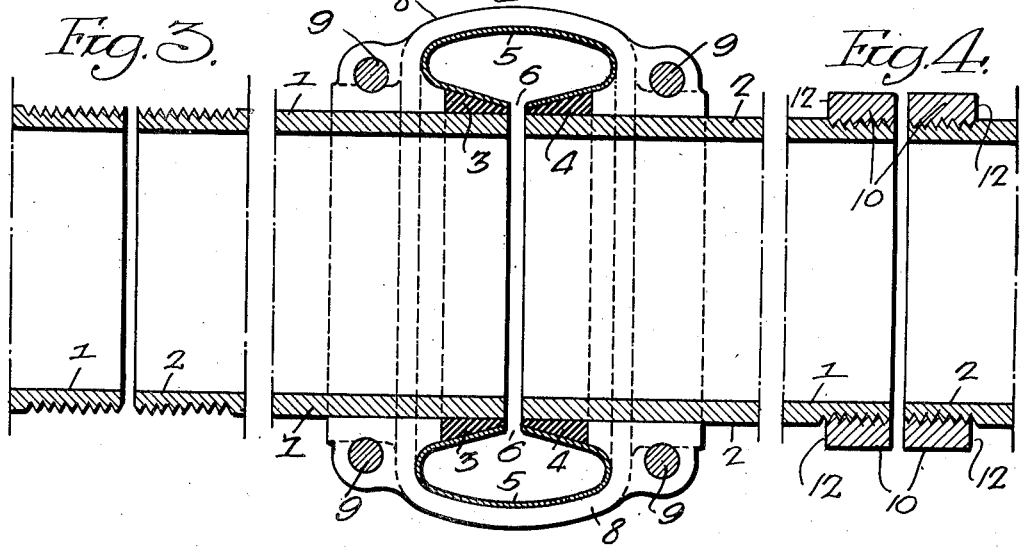
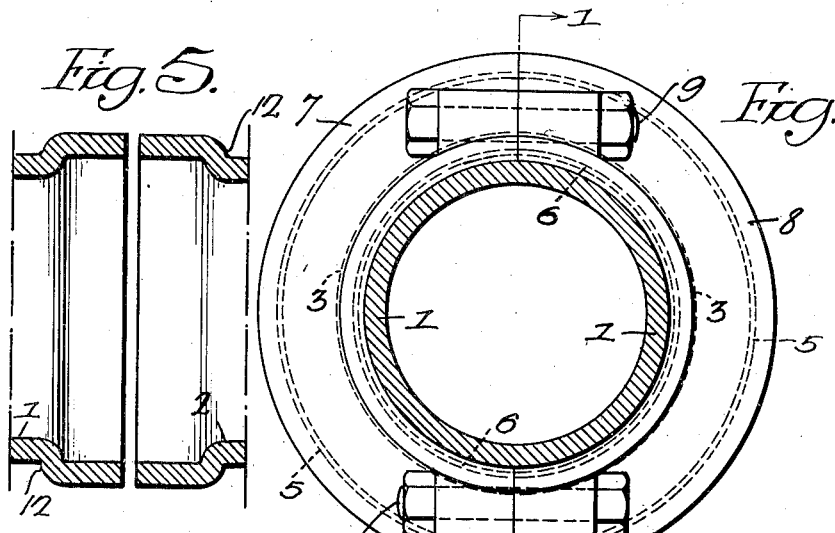
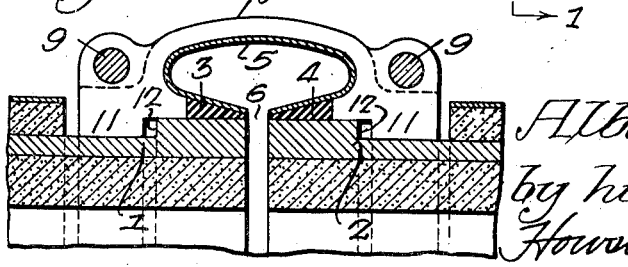
Inventor.
Albert L. Register,
by his Attorneys,
Howson & Howson.

Patented Feb. 2, 1926.

1,571,343

UNITED STATES PATENT OFFICE.

ALBERT L. REGISTER, OF HAVERFORD, PENNSYLVANIA.

PIPE UNION.

Application filed February 20, 1925. Serial No. 10,546.

*To all whom it may concern:*

Be it known that I, ALBERT L. REGISTER, a citizen of the United States, residing in Haverford, Pennsylvania, have invented a Pipe Union, of which the following is a specification.

This invention relates to pipe couplings or unions of the type which utilizes the pressure or vacuum within the pipe line to make and maintain the joints tight and leak-proof, and the principal object of the invention is to provide a connecter of this type having novel and improving features of construction as hereinafter fully described.

A more specific object of the invention is to provide a connecter more durable than other connecters of this type and one that is universally applicable to pipe lines regardless of the character of fluid or gas conveyed therethrough.

Another object of the invention is to provide a connecter of the stated type which is generally cheaper and easier to manufacture than like connecters, and which affords a wide choice of materials in its manufacture.

A further object of the invention is to provide a connecter of the type described which may be used in steam ducts, the connecter being practicable for use in lines of superheated steam.

In the attached drawings:

Figure 1 is a longitudinal section on the line 1—1, Fig. 2, showing the ends of two pipes joined by means of a union made in accordance with my invention;

Fig. 2 is a transverse section showing the union in end elevation;

Figs. 3, 4 and 5 are fragmentary longitudinal sections illustrating various types of pipe ends to which, among others, the union may be applied, and Fig. 6 is a longitudinal sectional elevation through a modified form of pipe union, one-half of such structure only being illustrated.

With reference to the drawings, 1 and 2 designate the ends of two pipes forming a part of a continuous duct. In accordance with my invention, I provide on the end of each pipe a gasket, 3 and 4 respectively, these gaskets preferably being of the general shape illustrated in Fig. 1. The union further comprises an annular member 5 in the form of a tube divided circumferentially on the inside, the member 5 enveloping the ends of the pipes 1 and 2, and positioned with the slot or aperture 6 opposite the juncture space of the abutting pipes. Those portions of the member 5 adjacent the division 6 are adapted to seat upon the upper surfaces of the gaskets 3 and 4, and the parts 3, 4 and 5 are housed and held in place by means in the present instance of a two-part housing, the parts 7 and 8 of which, as shown in Fig. 2, are clamped together by means of bolts 9. Preferably, the ends of the pipes are belled, as in Fig. 5, or provided with a shoulder forming sleeve 10, as in Fig. 4, and the housing is, in such cases, formed with parts 11, see Fig. 6, which in assembly occupy positions in back of the shoulders 12. Obviously the external form of this housing may vary widely, although it is desirable that it be so formed that, as shown in Fig. 1, the parts 3, 4 and 5 are neatly held in their proper relative positions.

Although the gaskets 3 and 4 and the member 5 may be formed of a large variety of materials, for ordinary purposes it is desirable to form the gaskets of rubber or suitable rubber composition, which may be chemically treated to render it impervious to corrosive and other substances passed through the duct. For special cases, it may be desirable to form these gaskets of other materials, such as synthetic resin material, cork, or other resilient bodies possessing the characteristics required in a gasket under the conditions described.

As regards the member 5, this may be made of metal, for example one of the ferric alloys including vanadium or a copper alloy such as bronze, having sufficient natural flexibility to normally bear firmly against the gaskets 3 and 4. The member 5, however, need not be of metal, and may be of other material such as vulcanized fibre, or fibre reinforced by metal. The fibre may be chemically treated to render it impervious to oil, water, acids and alkalies so that the coupling may be adapted to ducts for conveying practically any liquid or gas.

With the construction described, it is obviously unimportant, except for considerations of strength and durability, of what material the housing is formed. It will be understood that there is no limitation as to the character of materials employed in forming the gaskets 3 and 4 and the member 5, or the housing.

The operation of joints of this type will be more or less obvious. It will be noted that the interior of the member 5 has unobstructed connection with the interior of the duct through the division 6 and the space provided between the ends of the pipes. The fluid pressure in the duct is in this manner transferred to the interior of the member 5 and tends to expand the member, with the result that those parts of the member which seat upon the gaskets 3 and 4 are forced down firmly thereon. The greater the pressure in the duct the greater the force pressing the member 5 against the gaskets and the gaskets against the pipes, so that the joint is an absolutely efficient one and leak-proof.

Joints of this type have the further advantage of being in effect expansion joints, and with the housing 7—8 made as illustrated, the joint constitutes a union in contradistinction to the ordinary pipe coupling.

It will be apparent that with the present construction I have increased the scope of utility of this type of joint so that it is practically universally applicable to any type of pipe line, and that my invention eliminates certain well known manufacturing difficulties and greatly reduces the cost of manufacture of connecters of this type and the cost of replacement.

A particularly valuable application of the invention will be found in connection with lines of cement lined pipe which while having the material advantages of being non-corrodible have heretofore been considered generally impracticable by reason of the inability to form an efficient joint between pipe sections without prohibitive expense. The present connecter provides a highly efficient joint of great durability and flexibility which is at the same time of comparatively low cost of manufacture and which also is readily applied to cement lined pipe. One method of applying the connecter to pipes of this type is illustrated in Fig. 6. In this instance, the cement outer lining stops short of the ends of the pipes, providing a space for the housing 8, the gaskets 3 and 4 seating on the metal base pipes 1 and 2.

It will be apparent that the connecter as hereinbefore described is applicable to any type of pipe end, standard or otherwise, and in Figs. 3, 4 and 5, I have illustrated certain forms of pipe ends commonly met with to which, among others, the connecter may be adapted.

It will be understood that the device is subject to some modification without departure from the essential features of the invention as defined in the appended claims.

I claim:

1. A connector for pipes comprising a pair of annular gaskets adapted to be passed onto the ends of pipes to be connected; a separately formed annular tubular member divided circumferentially at the inside to provide an aperture and adapted to encircle the pipe ends with the portions adjacent the aperture on both sides seating upon the respective gaskets, whereby the interior of the tubular member is in communication with the interior of the pipe; and a housing for said annular member enclosing the ends of the pipes.

2. A connector for pipes comprising a pair of resilient annular gaskets adapted to be passed onto the ends of pipes to be connected; an annular, tubular member of flexible material divided circumferentially at the inside to provide an aperture and adapted to encircle the pipe ends with the portions adjacent the aperture on both sides seating upon the respective gaskets, whereby the interior of the tubular member is in communication with the interior of the pipes; and a housing for said annular member enclosing the ends of the pipes.

3. A connector for pipes comprising a pair or rubber gaskets adapted to be passed onto the ends of pipes to be connected; a separately formed annular tubular member of metal divided circumferentially at the inside to provide an aperture and adapted to encircle the pipe ends with the portions adjacent the aperture on both sides seating upon the respective gaskets, whereby the interior of the tubular member is in communication with the interior of the pipes; and a housing for said annular member enclosing the ends of the pipes.

ALBERT L. REGISTER.